United States Patent Office
3,051,572
Patented Aug. 28, 1962

3,051,572
METHOD OF PREPARING FLAVORED STABILIZED FEEDS
Talmadge B. Tribble, 1204 Westview Road, Glenview, Ill.
No Drawing. Filed May 18, 1959, Ser. No. 813,677
1 Claim. (Cl. 99—2)

This invention relates in general to flavored stabilized food products and has more particular reference to an antioxidant flavor having flavorstatic properties for flavoring and preserving livestock feeds and other food products.

For so much of the subject-matter disclosed herein which is also disclosed in my copending United States Letters Patent application, Serial No. 570,698, filed March 12, 1956, I claim the priority of that previously filed application.

Livestock feeds and feed preparations are customarily purchased by farmers in ton lots and stored prior to being consumed under unrefrigerated conditions as in a barn. During storage the fatty nutrients of the feed undergo oxidative deterioration which results in rancidity, off-odors and off-tastes in the feed thereby making it unpalatable to the livestock. Since animals are highly sensitive to flavors and odors, the development of off-taste and off-odors in livestock feed seriously affects the food intake of livestock.

To overcome this problem artificial flavoring has been added to livestock feed in sufficient quantity to produce a flavoring effect that masks the off-flavor and off-odor. It is evident that the farther the fat oxidation has progressed, the greater the quantity of flavoring required to produce the necessary flavoring effect. Since most flavorings that are employed are oily or fatty in nature, they too are subject to oxidative deterioration, and, in a short time experience a change in flavor and a diminished flavoring effect.

It has been known to add food-grade antioxidants to livestock feeds to prevent oxidative deterioration of fatty food nutrients. This has proved unsatisfactory since the antioxidants have a bitter off-taste which animals find undesirable so that the feed which has been stabilized against oxidation by addition of antioxidant is unpalatable to animals.

Livestock feeds and feed preparations may contain as much as 4% by weight of natural or inherent fat. This quantity is frequently increased by the addition of from about 1% to about 11% by weight of animal fats or greases to improve the nutritional value of the feed. The added animal fats and greases are so unpalatable that they are characterized as "inedible" and upon oxidation of these added fats the flavor of a feed deteriorates so rapidly and to such a great extent that livestock will not eat it unless great quantities of artificial flavoring are added. For example, when 11% animal fat is added to a feed, it is usually necessary to increase the amount of artificial flavoring by 500% to 600% of that required for the feed without the added animal fat to produce a feed preparation that the livestock will eat.

It is an object of this invention to provide an antioxidant flavoring composition which, when applied to a fresh feed, will preserve its fresh flavor and odor with a greatly reduced quantity of flavoring.

It is another object of this invention to provide a livestock feed preparation whose flavor and odor characteristics remain substantially unchanged during long storage periods under unrefrigerated conditions.

It is another object of my invention to provide a process for preparing livestock feeds whose odor and flavor remain substantially unchanged during long periods of storage under unrefrigerated conditions.

In one aspect this invention relates to an antioxidant flavoring composition which when properly applied to a fresh livestock feed, will impart a palatable flavor to the feed, will preserve both the character and flavoring effect of that flavoring and will prevent deterioration of the natural flavor of the feed. This composition comprises a combination of a flavoring material, and a food-grade antioxidant, the quantity of flavoring being sufficient to impart a palatable flavor to the feed and quantity of antioxidant being sufficient to prevent oxidative deterioration of the fatty nutrients of the feed and the oils or fats in the flavoring. Since some feed preparations have more fatty nutrients than others, and since various feeds require more flavoring than others to produce a palatable feed preparation, the composition of the antioxidant flavoring must be varied to suit the particular needs of each specific feed. Also, since the volume of antioxidant flavoring employed is small compared to the volume of feed that it is used with, frequently a carrier or extending medium is employed as a portion of the antioxidant flavoring composition. For most applications a mixture containing from about 1.5% by weight to about 50% by weight of antioxidant, from about 8% by weight to about 85% by weight of flavoring and from 0% to about 81% by weight of a carrier for the flavoring and antioxidant will produce the desired results.

The antioxidant flavoring of this invention drastically reduces the amount of flavoring required to produce a palatable feed because, when it is mixed with a fresh feed, it prevents the oxidation of fatty nutrients thereby preventing the formation of rancidity, off-flavors and off-odors so that there is little off-flavor and off-odor to mask. The flavoring required is that necessary to mask the bitter flavor of the antioxidant and the slight change of flavor of the feed which is stabilized against oxidation. Since the flavoring itself is also stabilized against oxidative deterioration, its flavoring effect is preserved for an extended period of time and less flavoring is thus required to yield the necessary flavoring effect. It has been found that when using the antioxidant flavoring of this invention, as little as 15% of the usual amount of flavoring will produce a palatable feed preparation.

In another aspect my invention relates to a livestock feed preparation comprising a livestock feed which may contain added animal fats and which is homogeneously mixed with the antioxidant flavoring hereinbefore described. This livestock feed preparation has what is known as flavor-static properties, or the quality of having an unchanging flavor and odor over prolonged periods of storage. As previously discussed, the composition of the feed preparation of this embodiment will vary depending on the flavor of the initial feed, its composition, the identity of the flavoring and other factors. Usually a feed preparation of from about 99.75% by weight to about 99.96% by weight of livestock feed (which may contain up to 15% by weight of natural and added fatty nutrients) and from about 0.25% by weight to about 0.04% by weight of antioxidant flavoring will result in a feed that is palatable to livestock and is substantially unchanging in aroma and flavor during long periods of storage.

In another aspect this invention relates to a method of preparing a livestock feed preparation. This method consists of homogeneously mixing fresh livestock feed, the fatty nutrient content of which has not undergone substantial oxidation, with from about 0.25% by weight to about 0.04% by weight of, for example, the above described antioxidant flavoring. The antioxidant flavoring may be homogeneously mixed with the feed by any suitable method such as spraying or fogging liquid antioxidant flavoring onto the feed or dusting or otherwise mixing powder-form antioxidant flavoring into the feed.

This process results in a feed preparation that retains its fresh flavor for long periods, up to several months, without deterioration of flavor. By deterioration, it is meant that the character of the flavor is changed to a less palatable one as distinguished from a less intense flavor or aroma that may result from volatilization of flavoring or portions thereof or changes in the feed due to the normal loss of moisture during storage.

The flavoring materials to be employed in this invention are those ordinarily employed to flavor livestock feed including anise oil, vanilla, citrus oil, other essential oils and esters. This invention is not limited to any particular flavorings, but involves the use of known flavorings in novel compositions and accordingly, substantially all livestock feed flavorings may be employed within its scope.

Many food-grade antioxidants may be employed in this invention including such well known antioxidants as butylated hydroxy anisole, butylated hydroxy toluene, citric acid, ascorbic acid, n-dihydroguaiaretic acid, and mixtures of these. Many commercial compositions having particularly suitable properties are available such as Tenox II, a product of the Tennessee Eastman Company, containing about 20% by weight of butylated hydroxyanisole, about 6% by weight of propyl gallate, about 4% by weight of citric acid and about 70% by weight of propylene glycol.

One of the advantages of the present invention is that the difficultly soluble antioxidants are readily dissolved in most of the oily flavorings thereby providing a single phase solution to apply to the feed. As hereinbefore stated, for convenience in applying it will frequently be desirable to produce a more voluminous solution of antioxidant and flavoring and this can be accomplished by dispersing both in a carrier. The carrier may be an inert liquid in which the flavoring and antioxidant are mutually soluble or it may provide some flavoring or antioxidant effect itself. The carrier may be volatile or non-volatile and it may even have nutritional or medicinal value. Suitable carriers include glycols, glycerine, water (when a stable emulsion of antioxidant flavoring is formed), aldehydes, esters, mineral oil and so forth. Propylene glycol is a presently preferred liquid carrier. Solid carriers such as mineral dusts, gum acacia, and other absorbent solid materials may also be employed.

The following formulations are presented to illustrate several presently preferred specific embodiments of this invention.

*Antioxidant Flavoring No. 1*

| | Percent |
|---|---|
| Tenox II | 1.6 |
| Anise oil | 98.4 |

The use of 0.05% by weight of this antioxidant flavoring with 99.95% by weight of low fat content feed will produce a feed preparation with flavorstatic properties.

*Antioxidant Flavoring No. 2*

| | Percent wt. |
|---|---|
| Butylated hydroxyanisole | 15 |
| Butylated hydroxytoluene | 15 |
| Citrus oil | 40 |
| Mineral oil | 30 |

The use of 0.05% by weight of this antioxidant flavoring with 99.95% by weight of high fat content livestock feed will produce a feed preparation with flavorstatic properties.

*Antioxidant Flavoring No. 3*

| | Percent wt. |
|---|---|
| Ascorbic acid | 50 |
| Anise oil | 8 |
| Corn sugar | 42 |

This antioxidant flavoring is in the form of a powder or dust and may be applied dry to the feed in proportions of about 0.04% by weight of antioxidant flavoring to 99.96% by weight of feed to produce a feed preparation having flavorstatic properties.

*Antioxidant Flavoring No. 4*

| | Percent wt. |
|---|---|
| Butylated hydroxyanisole | 0.3 |
| Citric acid | 0.3 |
| Propylene glycol | 0.9 |
| Anise oil | 18.5 |
| Powdered gum acacia | 80.0 |

This antioxidant flavoring is in powdered form and should be employed in the proportion of 0.25% by weight of antioxidant flavoring to 99.75% by weight of feed to produce flavorstatic properties.

*Antioxidant Flavoring No. 5*

| | Percent wt. |
|---|---|
| Tenox II | 15.6 |
| Anise oil | 84.4 |

A feed preparation containing 0.05% by weight of this antioxidant flavoring, 11% animal grease and 88.95% feed was composited and found to have flavorstatic properties.

To illustrate the advantages of this invention, the feed preparation of antioxidant flavoring No. 5 was compared with three other feed preparations. The first was a mixture of 11% by weight of the same fresh animal grease and 89% by weight of the same feed, the second was a mixture of 11% by weight of the same fresh animal grease, 0.05% by weight of anise oil and 88.95% by weight of the same feed and the third was a mixture of 11% by weight of the same fresh animal grease, 88.95% by weight of the same feed and 0.05% by weight of Tenox II.

All four feed preparations were stored under identical conditions for three weeks during which the temperature varied from a low of 68° F. to a high of 90° F. At the end of the three week period all four feed preparations were examined and tested. The feed preparation consisting only of feed and animal grease had developed strong rancid off-odors which were highly objectionable. The feed preparation consisting only of feed, animal grease and anise oil when freshly prepared had the delicate aroma of anise oil, but after the three week storage period all anise aroma was gone and a rancid off-odor indistinguishable from the unflavored feed preparation prevailed. The feed preparation consisting of feed, animal grease and Tenox II had no rancid smell and the feed preparation prepared with antioxidant flavoring No. 5 had no rancid smell, but instead it still had the delicate aroma of anise oil, although it was not as strong as when first composited.

Following the three week storage period, the four feed preparations were tested as to animal acceptability in free-choice animal feeding tests. In all tests the feed preparation prepared with antioxidant flavoring No. 5 was the only feed preparation that any animal would eat.

The foregoing tests indicate the readily-perceived off-odors and rancidity of a feed can be prevented by the antioxidant flavorings of this invention. The tests also demonstrated that the character of the flavoring is preserved. More important, however, than the human observations is that livestock find the feed prepared with the antioxidant flavoring of this invention palatable after a prolonged storage period and the same livestock find unflavored, but stabilized feed preparations and all unstabilized preparations unpalatable.

The antioxidant flavoring of this invention provides a means for improving the palatability of livestock feeds employing far less artificial flavoring than was heretofore required. In addition to employing less flavoring, the flavoring effect of the flavoring is preserved so that it is effective longer and, in addition, the palatability of a feed is preserved for prolonged storage periods so that less flavoring is required. As a result of these effects the problem of spoilage of livestock feed during storage is largely eliminated by employing very small quantities of the antioxidant flavoring of this invention.

Having thus described my invention, it will be apparent that it is capable of being practiced in many ways and that many material alternatives and substitutions may be employed in its use. I, therefore, prefer that my invention be regarded as being limited only as set forth in the following claim.

I claim:

A method of preparing a livestock feed composition which comprises homogeneously mixing fresh livestock feed with stabilizing flavoring to form a mixture of from about 99.75% to about 99.96% by weight of fresh feed and from about 0.04% to about 0.25% by weight of a stabilizing flavoring, said flavoring comprising from about 8% to about 85% by weight of an edible oxidizable flavoring, from about 1.5% to about 50% of a food grade antioxidant and from about 0% to about 81% by weight of a carrier for said flavoring and said antioxidant.

References Cited in the file of this patent

UNITED STATES PATENTS

| | | |
|---|---|---|
| 2,369,847 | Olsen et al. | Feb. 20, 1945 |
| 2,504,788 | Baker | Apr. 18, 1950 |
| 2,657,997 | Rusoff | Nov. 3, 1953 |
| 2,690,396 | Chenicek | Sept. 28, 1954 |